3,005,703
TREATMENT OF HEAVY METALS
Thomas Edward Allibone, Newbury, England, assignor to Associated Electrical Industries Limited, London, England, a British company
Filed Jan. 9, 1956, Ser. No. 558,121
Claims priority, application Great Britain Jan. 11, 1955
13 Claims. (Cl. 75—84.1)

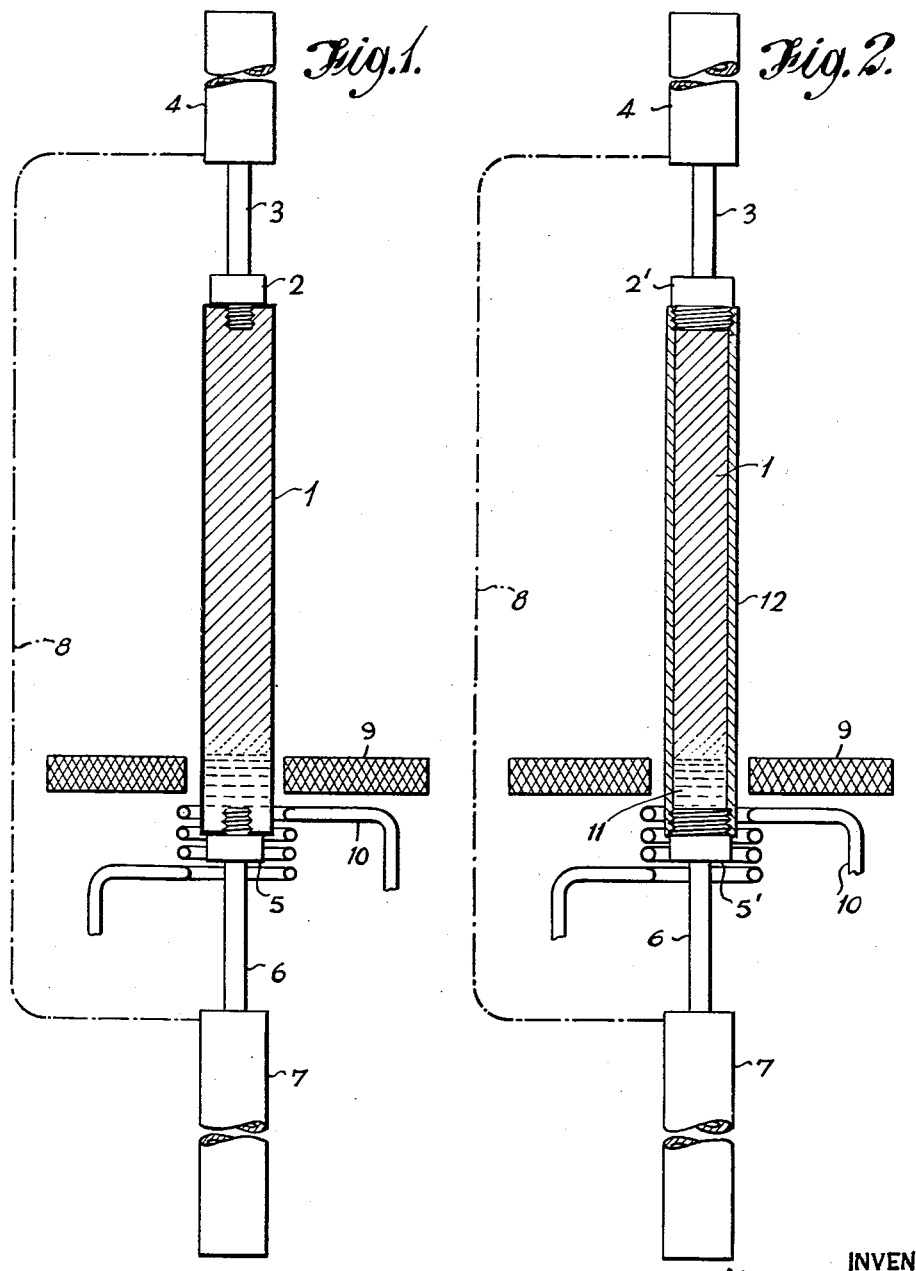

This invention relates to the treatment of heavy metals for the separation of lighter constituents and has an important application in the treatment of metals such as uranium and thorium used in nuclear reactors.

In nuclear reactors employing ordinary uranium metal as fuel the neutrons released at fission convert some uranium into plutonium and in addition form roughly the same amount of fission products. It is desirable to eliminate the fission products because some of them have high absorption cross sections for capturing neutrons and it may be desirable also to remove plutonium from the uranium. At present these products are removed by chemical methods involving the dissolving of the whole of the uranium, so that before the uranium can be used again in the reactor it has to be processed from solution to metallic form in well known steps which are expensive. The metal in the reactor is usually in the form of a bar or rod and where this is encased for example in aluminium or zirconium or other metal or refractory material, this casing will usually be dissolved away in the process of removing fission and other products.

The main object of the invention is to provide an improved process suitable for removing the fission and other products.

The present invention comprises a process for treating heavy metals consisting in applying heat to melt a horizontally extending zone of the metal and progressing the molten zone upwardly from the bottom to the top of the metal under treatment so that the lighter impurities are transferred to the top for removal.

Preferably the metal is melted by electrical induction heating.

In the case of nuclear reactor rods, such as uranium or thorium rods, the rods would be lowered through a heater such as an induction coil so that the heating passes vertically from bottom to top of the bar sufficient power being delivered to the metal rod to melt it locally in the region of the heater whilst below and above the molten zone the metal remains below the melting point. Casings made of zirconium or zirconia or stainless steel or other high temperature melting point materials will remain solid whilst the uranium or thorium is molten in the hot zone. With casing materials having lower melting points it may be necessary to cool the outer skin of the casing materials if it is desired to prevent them from melting. Such cooling may be effected in any suitable known manner, for example, by liquid or gas cooled jackets. In induction heating the degree of penetration of flux is an inverse function of the frequency of alternation of the flux, so if a sufficiently low frequency is chosen when melting uranium in say aluminium tubes, the heating of the uranium can take place by virtue of the currents induced in the uranium rather than by thermal conduction from the aluminium and in this way the uranium may be held in the molten state inside an aluminium tube which remains solid despite the fact that it has a lower melting point. If the rod is lowered slowly through an induction heater the narrow zone of molten metal can be moved from the bottom of the bar to the top. This will allow gaseous products of fission to escape from being trapped in the crystalline structure of the metal and it will also allow those other products of fission which are not readily soluble in the molten metal to escape by a flotation process since the densities of the materials used in the reactor, i.e. uranium and thorium, are far higher than those of any of the fission products. Such a treatment renders a reactor rod far less radioactive and therefore safer to handle for further processing. By repeating the process a number of times it may be possible to render the residue of neutron capturing fission products sufficiently low to enable the bar to be re-inserted into the reactor without further treatment.

According to a further feature an absorbent metal is added to the molten zone of the metal under treatment which absorbent metal is such that in the liquid form it will alloy with or dissolve unwanted metal or metals but will not alloy with or dissolve the metal under treatment and said absorbent metal is caused to progress upwardly with the molten zone so as to traverse the length of the rod and thereby carry with it an appreciable proportion of the unwanted metal or metals to the upper end of the rod.

Such a process may be employed, for example, for removing plutonium from uranium rods by employing as an absorbent material a material which will dissolve or alloy with plutonium but not uranium, such a process having the advantage that the plutonium may be subsequently recovered from the absorbent material after the latter has traversed the rod.

Suppose for example metal "A" dissolves plutonium but not uranium, or dissolves one or other of the solid fission product elements but not uranium. Let the metal A be inserted into the bottom of the "can" containing the uranium, i.e. within the casing, and then let the "can" be sealed hermetically again as it was before. Then let the metal bar be passed as before through the induction coil from bottom to top, taking the metal A up to its melting point, and the metallic uranium adjacent to A also up to its melting point. As uranium is heavier than any metal A which can be introduced, as A melts, and then as the adjoining uranium above A melts, the uranium will displace the metal A due to its density, and, if plutonium is contained within the uranium, it will dissolve in, and remain in metal A. Metal A will rise till it cools and solidifies, but the bar of metal may then be lowered a little through the induction coil, so that the metal A will once more be melted; the bar can in fact be lowered at such a speed that the floating molten zone of A can be kept molten as it floats from bottom to top of the whole length of the uranium bar, and as it replaces, by melting, successive zones of uranium so it dissolves out the plutonium. Depending on the rate of dissolution of plutonium in metal A the process may have to be repeated a number of times. It does not make much difference whether the metal A has a higher or lower melting point than uranium; if lower, it will be a molten zone entrapped by solid uranium above it until that uranium adjacent to it is liquified; if higher, liquid uranium will be resting on it until it melts, then it will be displaced upwards till it meets solid uranium and will remain there till the induction coil is raised.

In this way, by correct choice of metal A—or a compound thereof, plutonium, and/or, the fission products of uranium may be removed, or reduced in amount whilst leaving metallic uranium within the metal or ceramic "can" in which it was originally canned.

The metal A may be introduced in a variety of ways. Thus a pellet of A may be incorporated in the uranium bar when originally made, for example at the end of the bar, so that it does not reside in the region of maximum neutron flux in the reactor, and then, when the "hot" (i.e. radioactive) bar is removed the metal A will be in place at the bottom of the bar, when held vertically. Instead of having to leave these bars in deep wells for days until their radioactivity has declined somewhat the bars would at once be passed through the heater a number of times.

Preferably so that the first pass merely melts the uranium to release the gaseous fission products, the second pass melts an inserted metal A to take out the fission products and the third pass melts a metal B inserted as described above to dissolve out plutonium; by correct choice of metals or compounds A and B it should be possible with A to remove many of the fission products in uranium and then with B to remove the plutonium.

If the metals A, B etc., are not introduced into the canned rods of uranium before insertion into the reactor, the rods, removed from the reactor, could be cut open at one end, and the metal or metals A and B be inserted, or be contained in a can to be shrunk on, or welded on, or clamped on to the open end of the uranium containing can, and then the zone melting process be followed through.

Clearly the invention is not limited to the insertion of only two metals but more than two can be employed, e.g. one metal may remove some of the fission products and another metal other products.

The same process may be applied to rods or slabs of thorium which may be used in or around a reactor to absorb neutrons and, in so doing, produce the element uranium with mass 233. It is likely that the concentration of U233 in thorium metal will always be low, no matter how a reactor is designed, so the expense of dissolving all the thorium in order to extract the small amount of fissile U233 may be a very serious factor in the economy of the "breeder reactor" which makes use of the thorium lining. If a metal A is chosen which dissolves uranium whilst not appreciably dissolving thorium, this zone melting process could remove the uranium whilst leaving thorium metal to be used almost indefinitely in metallic form without any need for chemical processing.

Likewise, in reactors employing fuel in highly enriched form, for example high concentrates of U235, or bars of pure plutonium, there will come a time when the neutron capture by the fission products becomes serious enough to call for a repurification of the fuel element. Instead of dissolving it, the plutonium rod encased in say zirconium could be treated in this zone heating manner by choice of metal or compound A which dissolves some or all of the elements of the fission yield whilst not dissolving appreciably the plutonium or the uranium (in the case of enriched uranium 235 bars).

In the foregoing the process of localized heating is effected by induction heating. Provided the encasing metal or compound has a higher melting point than the metal within the case, metal A or uranium, thorium, plutonium, etc., any localised heating process can be employed such as a central hot zone of a furnace, but where the melting point of the case is near to that of the contents induction heating is to be preferred.

In carrying out the invention one or more of the metals silver, cerium, lanthanum or magnesium may be used for metal A.

These metals may also be used for metal B.

According to a further aspect the invention also comprises apparatus for treating heavy metals to remove unwanted constituents including a heater and means for effecting relative vertical movement between the heavy metal under treatment and the heater in such a manner as to progress a molten zone from the bottom to the top of the metal under treatment.

Preferably also the heater is maintained stationary and means are provided for moving the material which may be in rod form vertically downwards through the heater. Apparatus for controlling the speed of movement may also be provided.

Cooling means may be provided and means for removing unwanted constituents from the apparatus.

The invention will now be described with reference to the diagrammatic representation in the accompanying drawing in which FIGS. 1 and 2 respectively show embodiments of the invention.

In FIG. 1 the reference 1 indicates a uranium or thorium bar which has undergone a nuclear fission reaction. The bar is supported at its upper end by a support 2 which is shown as screwed on to the end of the bar and is connected by a rod 3 with suitable servo apparatus 4. Similarly, the lower end of the bar 1 is supported by a support 5 screwed into the end of the bar and connected through a rod 6 with suitable servo apparatus 7.

The two servo apparatus may be intercoupled through a connection indicated by the dotted line 8 to ensure synchronous operation.

The reference 9 indicates an induction heater coil whilst 10 indicates liquid ducting for cooling the part of the rod 1 which has passed through the heater coil 9.

The reference 11 indicates a plug of absorbent material which, as above stated, may be one of the metals silver, cerium, lanthanum or magnesium.

FIG. 2 shows a modified arrangement in which the uranium or thorium is supported in a cylindrical container 12 for processing instead of in the manner shown in FIG. 1.

What I claim as new and desire to secure by Letters Patent of the United States is:

1. A process of separating plutonium from uranium fuel rods which have been subjected to neutron bombardment in a nuclear reactor comprising adding an absorbent for plutonium to the metal which alloys with the plutonium without alloying with the uranium and which is of lighter atomic weight than the uranium, applying heating to melt a horizontally extending zone of the metal and said absorbent, progressing the molten zone upwardly to the top region of the uranium rod under treatment so that the absorbent is transferred by flotation to the top region and removing said absorbent together with the absorbed plutonium thereby leaving the unalloyed uranium substantially free of plutonium.

2. A process of removing fission products from thorium which has undergone neutron bombardment consisting in adding at least one metal of the group consisting of silver, cerium, lanthanum and magnesium to the thorium, melting a horizontally extending zone of the thorium and said one metal so that the added metal alloys only with said fission products without dissolving thorium, and progressing the zone upwardly to the top region of the thorium so that the added metal with its absorbed constituents is transferred by flotation to the top region of the thorium.

3. A process of separating fission products from canned rods of a heavy metal fissionable under the action of neutrons wherein the fission products are of lighter atomic weight than said heavy metal and are not readily soluble in the heavy metal in its molten state, said process comprising: applying heating to melt a horizontally extending zone of the metal in the can so that the insoluble fission products of lighter atomic weight rise to the top of the molten zone of metal, progressing the molten zone upwardly from the bottom to the top region of the metal so that the lighter fission products are transferred by flotation to the top region, and removing said fission products from the top region.

4. A process of removing fission products from canned rods of a metal fissionable under the action of neutrons comprising adding at the bottom of the can at least one absorbent which alloys with said fission products without alloying with said metal and which is of lighter atomic weight than said metal, applying heating to melt a horizontally extending zone of the metal and progressing the molten zone upwardly from the bottom region to the top region of the metal under treatment so that the said absorbent is transferred by flotation to the top region, and removing the absorbent containing the fission products from the top region.

5. A process of removing uranium 233 from thorium comprising adding an absorbent for uranium 233 to the thorium which alloys with uranium 233 without dissolving the thorium and which is of lighter atomic weight than the thorium and uranium 233, melting a horizontally extending zone of the thorium, progressing the molten zone upwardly from the bottom to the top of the thorium so that the absorbent is transferred by flotation to the top, and removing the absorbent and absorbed uranium 233.

6. A process of removing impurities of a heavy metal of the group consisting of uranium and plutonium which has undergone a nuclear fission reaction and is contained in a casing of lower melting point, wherein said impurities are of lighter atomic weight than said heavy metal and are not readily soluble with the heavy metal in its molten stage, said process consisting in applying low frequency electrical induction heating to melt a horizontally extending zone of the interior only of the metal and progressing the molten zone upwardly from the bottom region to the top region of the metal under treatment so that the said impurities of the original metal are transferred by flotation in the molten zone to the top for removal, and cooling the exterior of the casing to avoid melting.

7. A process of treating elongated rods of heavy metals fissionable under the action of neutrons for removing fission products having atomic weights lower than the atomic weight of the said metals and which are not readily soluble in the heavy metals in their molten stage, wherein the rods of the heavy metals are contained in casings, said process comprising: mounting a rod of said metal contained in its casing and to be treated in a vertical position; applying localized heating by a low frequency alternating flux to a horizontal cross-section zone beginning near the bottom of said rod to melt an interior region of said rod without melting said casing; and progressing the molten zone upwardly from the bottom to the top of said rod to transfer said fission products by flotation to the top portion of said rod.

8. A process of treating elongated rods of heavy metals fissionable under the action of neutrons and encased in a different material following neutron bombardment of said rods in a nuclear reactor for removing impurity atoms having a lighter atomic weight than the heavy metals and which are not readily soluble in the heavy metals in their molten stage, said process comprising mounting a rod of said heavy metal to be treated in a vertical position; applying localized heat by a low frequency alternating flux to a horizontal cross-section zone beginning near the bottom of said rod to melt the heavy metal without melting the encasing material; and progressing the molten zone upwardly from the bottom to the top of said rod to transfer the impurity atoms by flotation to the top portion of said rod.

9. A process of heating elongated rods of a first heavy metal which transmutes under the action of neutrons into a further heavy metal fissionable under the action of neutrons, said rods being encased in a different material and containing in a central portion near one end thereof, a slug of material having a lower atomic weight than the atomic weight of said heavy material in which said further heavy material dissolves but said first heavy material does not dissolve comprising: mounting a rod of said first heavy material which has been subjected to neutron bombardment in a nuclear reactor in a substantially vertical position; applying localized heat to a horizontal cross-section zone beginning near the bottom of said rod at the end where said slug of material is located to melt the slug of material and the first heavy metal without melting the encasing material; and progressing the molten zone upwardly from the bottom to the top of said rod to transfer the slug of material along with atoms of said further heavy material to the top portion of said rod.

10. The process as defined in claim 9 wherein said further heavy metal is plutonium.

11. The process of treating an elongated rod of a heavy metal fissionable under the action of neutrons, said rod being encased in a different material to be used as a fuel element in a nuclear reactor comprising: providing at one end of said rod a slug of a material having a lower atomic weight than the atomic weight of said heavy metal in which one or more particular impurities in said elongated rods will dissolve but said heavy metal does not dissolve, mounting said rod in a substantially vertical position with said slug at the bottom thereof; applying localized heat to a horizontal cross-section zone beginning near the bottom of said rod but above said slug to melt an interior region of said rod without melting the outer encasing material; progressing the molten zone upwardly from the bottom to the top of said rod to transfer to the top portion of said rod impurity atoms of lighter atomic weight than the heavy metal and which are not readily soluble in the heavy metal in its molten stage; then re-applying localized heat to a horizontal cross-section zone beginning near the bottom of said rod and causing said slug of material to melt along with the interior region of said rod without melting the encasing material; and progressing the molten zone upwardly from the bottom to the top of said rod to transfer said slug of material along with atoms of impurities dissolved therein to the top portion of said rod.

12. A process for removing impurity atoms from elongated rods of uranium encased in a different material after having been subjected to neutron bombardment in a nuclear reactor wherein the impurity atoms are of lower atomic weight than the uranium and are not readily soluble in the uranium in its molten stage comprising: mounting said elongated rod in a vertical position; applying localized heat to a horizontal cross-section zone at about the bottom of said rod to melt the uranium in a first molten zone without melting the encasing material; progressing the first molten zone upwardly toward the top of said rod to transfer certain impurity atoms by flotation to the top portion of said rod; applying localized heat to a horizontal cross-section zone containing an impurity absorbent material at the bottom of said rod to melt the uranium and said impurity absorbent material in a second molten zone without melting the encasing material; and progressing the second molten zone upwardly to the top of said rod.

13. A fuel element processing cycle for removing relatively small quantities of impurity atoms from elongated rods of heavy metals, the atoms of which are fissionable under the action of neutrons to emit new neutrons in a chain, said impurity atoms being of lower atomic weight than said heavy metals and which are not readily soluble in the heavy metals in their molten stage, said process comprising the steps of removing a fuel rod from a nuclear reactor after having been subjected to neutron bombardment in the reactor; mounting said rod to be treated in a vertical position; applying localized heat by a low frequency alternating flux to a horizontal cross-section zone beginning near the bottom of said rod to melt an interior region of said rod without melting the outer surface; progressing the molten zone upwardly from the bottom to the top of said rod to transfer impurities by flotation to the top portion of said rod; and then re-inserting said rod in a nuclear reactor for further neutron bombardment.

References Cited in the file of this patent

UNITED STATES PATENTS

| | | |
|---|---|---|
| 2,465,893 | Long | Mar. 29, 1949 |
| 2,719,799 | Christian | Oct. 4, 1955 |
| 2,739,088 | Pfann | Mar. 20, 1956 |
| 2,743,199 | Hull et al. | Apr. 24, 1956 |

(Other references on following page)

UNITED STATES PATENTS 2,747,971 Hein _____ May 29, 1956
2,782,117 Wilhelm _____ Feb. 19, 1957

OTHER REFERENCES

Keck et al.: J. Applied Physics, vol. 24, No. 12, pages 1479–1481, December 1953.

Keck et al.: Phys. Rev. 89, 1297 (1953).

Schumacher: J. of Metals, November 1953, pp. 1428 and 1429.

Keck et al.: "Review of Scientific Instruments," vol. 25, No. 4, April 1954, pp. 331–334.